United States Patent
Cao

(10) Patent No.: US 9,560,033 B2
(45) Date of Patent: *Jan. 31, 2017

(54) METHOD AND SYSTEM FOR AUTHENTICATING USER IDENTITY

(71) Applicant: Alibaba Group Holding Limited, George Town, KY (US)

(72) Inventor: Kai Cao, Hangzhou (CN)

(73) Assignee: Alibaba Group Holding Limited (KY)

(*) Notice: Subject to any disclaimer, the term of this patent is extended or adjusted under 35 U.S.C. 154(b) by 0 days.

This patent is subject to a terminal disclaimer.

(21) Appl. No.: 14/954,665

(22) Filed: Nov. 30, 2015

(65) Prior Publication Data

US 2016/0087962 A1   Mar. 24, 2016

Related U.S. Application Data

(63) Continuation of application No. 14/309,538, filed on Jun. 19, 2014, now Pat. No. 9,231,937.

(30) Foreign Application Priority Data

Jun. 24, 2013 (CN) .......................... 2013 1 2525777

(51) Int. Cl.
*H04L 29/06* (2006.01)
*G06F 21/43* (2013.01)
(Continued)

(52) U.S. Cl.
CPC ................ *H04L 63/08* (2013.01); *G06F 21/00* (2013.01); *G06F 21/42* (2013.01); *G06F 21/43* (2013.01);
(Continued)

(58) Field of Classification Search
CPC .......... H04L 63/08; H04L 63/18; H04L 63/12; H04L 63/102; G06F 21/00; G06F 21/43; G06F 21/42; G06Q 20/425
(Continued)

(56) References Cited

U.S. PATENT DOCUMENTS 8,554,689 B2 * 10/2013 Mardikar ........... G06Q 20/1085
705/64
8,577,336 B2 * 11/2013 Mechaley, Jr. ...... G06Q 20/027
455/411

(Continued)

FOREIGN PATENT DOCUMENTS

GB          2481663 A     1/2012
WO    2010048097 A2     4/2010
WO    2012005653 A1     1/2012

OTHER PUBLICATIONS

Anonymous: 'Multi-factor authentication—Wikipedia, the free encyclopedia', Jun. 21, 2013 (Jun. 21, 2013), XP055140097, Retrieved from the Internet: URL:http://en.wikipedia.org/w/index.php?title=Multi-factor_authentication&oldid=560986217#cite_note-18 [retrieved on Sep. 15, 2014].

(Continued)

*Primary Examiner* — Kambiz Zand
*Assistant Examiner* — Benjamin Kaplan
(74) *Attorney, Agent, or Firm* — Van Pelt, Yi & James LLP

(57) ABSTRACT

Embodiments of the present application relate to a method for authenticating user identity, a system for authenticating user identity, and a computer program product for authenticating user identity. A method for authenticating user identity is provided. The method includes generating a first verification code by a server, displaying the first verification code to a user in an application scenario of a service requiring user identity authentication, receiving a second verification code sent by the user via another application that is other than the application scenario, comparing the second verification code sent by the user and the first verification (Continued)

code generated by the server, and determining whether the user has passed identity authentication based on a result of the comparison.

19 Claims, 6 Drawing Sheets

(51) Int. Cl.
  *G06Q 20/42* (2012.01)
  *G06F 21/00* (2013.01)
  *G06F 21/42* (2013.01)

(52) U.S. Cl.
  CPC ........... *G06Q 20/425* (2013.01); *H04L 63/102* (2013.01); *H04L 63/12* (2013.01); *H04L 63/18* (2013.01)

(58) Field of Classification Search
  USPC ....................................................... 726/7, 28
  See application file for complete search history.

(56) References Cited

U.S. PATENT DOCUMENTS

| | | |
|---|---|---|
| 2004/0030935 A1 | 2/2004 | Kai |
| 2007/0180503 A1 | 8/2007 | Li et al. |
| 2010/0009658 A1* | 1/2010 | Wu ....................... H04M 1/673 455/411 |
| 2010/0131409 A1* | 5/2010 | Lawyer ............. G06F 17/30528 705/44 |
| 2012/0129492 A1* | 5/2012 | Mechaley, Jr. ...... G06Q 20/027 455/411 |
| 2013/0104213 A1* | 4/2013 | Nandakumar .......... G06F 21/31 726/7 |
| 2013/0139222 A1* | 5/2013 | Kirillin .................. H04L 67/02 726/4 |

OTHER PUBLICATIONS

Anonymous: 'One-time password—Wikipedia, the free encyclopedia', Jun. 22, 2013 (Jun. 22, 2013), XP055140115, Retrieved from the Internet: URL:http://en.wikipedia.org/w/index.php?title=One-time_password&oldid=561017004 [retrieved on Sep. 15, 2014].

* cited by examiner

METHOD AND SYSTEM FOR AUTHENTICATING USER IDENTITY

CROSS REFERENCE TO OTHER APPLICATIONS

This application is a continuation of co-pending U.S. patent application Ser. No. 14/309,538, entitled METHOD AND SYSTEM FOR AUTHENTICATING USER IDENTITY filed Jun. 19, 2014 which is incorporated herein by reference for all purposes, which claims priority to People's Republic of China Patent Application No. 201310252777.2 entitled A METHOD AND DEVICE USED TO AUTHENTICATE USER IDENTITY, filed Jun. 24, 2013 which is incorporated herein by reference for all purposes.

FIELD OF THE INVENTION

This application relates to a method and system for authenticating user identity.

BACKGROUND OF THE INVENTION

With the expansion of the Internet, many activities previously conducted face-to-face in real life are gradually being replaced by communications over the Internet.

With the spread of network applications, an increasing number of people are using network applications for online shopping and online payment. To ensure security, when accessing systems having high security requirements such as online banking to perform an operation, users are typically first required to authenticate their identity (also known as "identity verification" or "authorization"). Only when a user's identity conforms to a set of requirements is the user confirmed as a valid user.

One conventional identity authentication method is as follows: when a user is to access a system, a server where the system is located sends a text message, via a telecommunications service or short message system (SMS) using an SMS service interface, to the user's mobile phone, and the text message includes a verification code randomly generated by the server. Upon receipt of this text message, the user enters the verification code included in the text message into a login screen of the system. Subsequently, the entered verification code is sent to the server. The server compares the received verification code against the previously sent verification code. If the two codes match, then the user is determined to be authenticated.

Specifically, a random number can be generated on the server and sent to the designated mobile telephone via the text message. Upon receipt of the random number, the user enters this random number during the login process and submits the random number to the server. The server confirms that the user is the owner of the designated mobile phone by verifying the random number, thereby the user has passed identity authentication.

However, security risks in the above conventional identity authentication method exist. Hackers or cheats could possibly intercept text messages by embedding a mobile phone Trojan or using deception to fraudulently obtain contents of the text message, and victims would remain unaware during this process (in the case of mobile phone Trojans), or simply tell the cheats the contents of the text message (in the case of deception). As a result, the cheats and/or the hackers would obtain the contents of the text message, and successfully steal the victims' identity or funds.

BRIEF DESCRIPTION OF THE DRAWINGS

Various embodiments of the invention are disclosed in the following detailed description and the accompanying drawings.

The purpose of the drawings described here is to provide further understanding of the present application, and they constitute a part of the present application. The illustrative embodiments of the present application and their descriptions are for explaining the present application and do not constitute improper restrictions on the present application. In the drawings.

DETAILED DESCRIPTION

Figure 1:
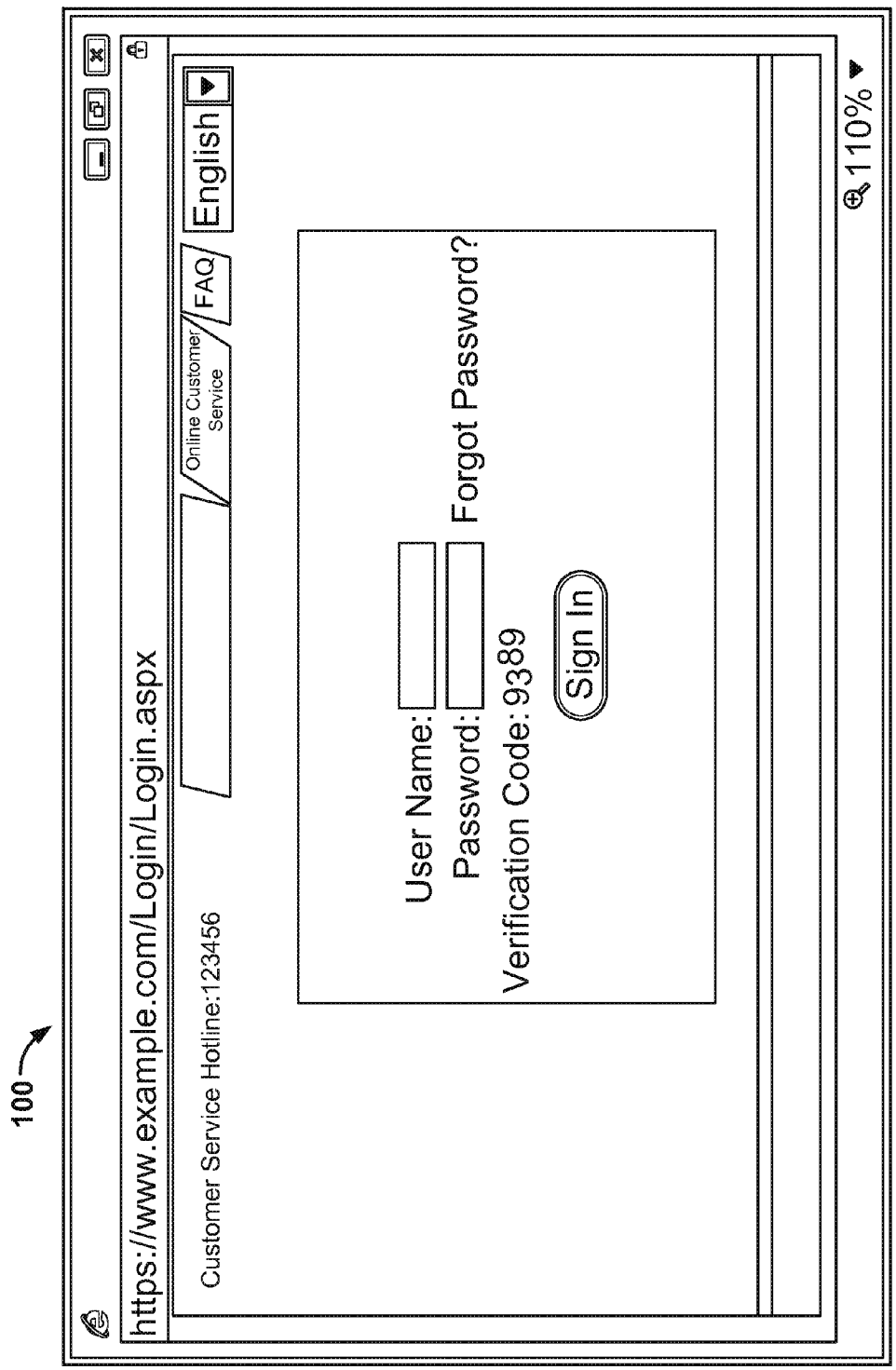
FIG. 1 is an illustration of an example of an application scenario of an authentication service.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The present application describes an authentication technique. In some embodiments, the server no longer sends a verification code to a designated mobile phone, but instead, following the application scenario, releases the verification code directly to the designated mobile phone. After, the user sends the verification code obtained during the application scenario to the server via an uplink message using an application other than the application scenario. In some embodiments, the application scenario relates to an application. Typically, an application scenario describes how and when an application is to be used. For example, an application scenario can relate to a payment application. The payment application allows money to be paid to another party in relation to a purchase or can transfer money to another party. Typically, the payment application on an E-commerce website corresponds to a checkout cashier. Before the user receives a verification successful prompt, the server confirms that identity authentication (also known as "identity verification" or "authorization") is successful, and releases a service request submitted in the application scenario, thereby achieving authentication of the user identity and protecting security.

FIG. 1 is an illustration of an example of an application scenario of an authentication service. In this application scenario 100, a service refers to a product or service currently being used by a user, such as a web service for the user to pay a bill, purchase a product, etc. The application scenario of the service refers to a current scenario of the product or service being used.

In the application scenario 100, identity authentication is performed where the user must enter a user name and password.

A verification code is displayed in the application scenario 100.

In some embodiments, the application scenario 100 is a web page, as shown in FIG. 1. In other embodiments, the application scenario 100 is not limited to being a web page, and can be an enterprise application, a server application, a client application, or another type of application. In fact, the application scenario can be any scenario requiring identity authentication, for example, requiring entry of a password. These application scenarios include but are not limited to account number requests, password changes, new account permission requests, account information changes, online shopping, online payments, mobile payments, community access controls, etc.

Figure 2:
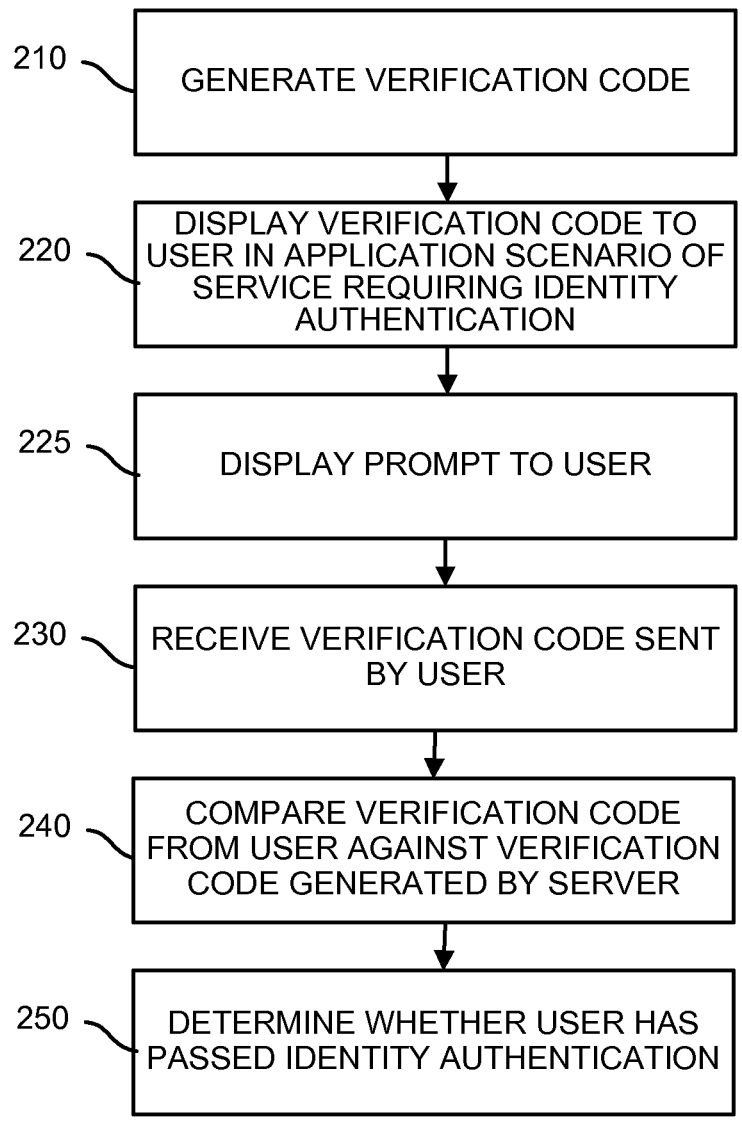
FIG. 2 is a flowchart of an embodiment of a process for authenticating user identity.

FIG. 2 is a flowchart of an embodiment of a process for authenticating user identity. In some embodiments, the process 200 is applied in the application scenario 100 of FIG. 1 and implemented by a server 520 of FIG. 5, and comprises:

In 210, the server generates a verification code.

In some embodiments, the server employs any appropriate method to generate the verification code.

In some embodiments, the verification code corresponds to a random number.

In some embodiments, the verification code includes other characters, such as numerals, English alphabetic characters, numerals and English alphabetic characters, Chinese characters, or any combination thereof.

In 220, the server displays the verification code to the user in an application scenario of a service requiring identity authentication.

In some embodiments, the server displays the verification code directly in the application scenario 100, as shown in FIG. 1.

In some embodiments, words "display verification code" are displayed in the application scenario 100. For example, a button bearing the words "display verification code" is shown in the application scenario 100. When the user clicks on the "display verification code" button, the verification code is displayed to the user in the application scenario 100.

Referring to FIG. 2, optionally, in 225, the server displays a prompt to the user. The prompt is used to prompt the user to send the displayed verification code to the server via an application other than the application scenario.

In some embodiments, the server displays this prompt in the application scenario. For example, this prompt is displayed in the application scenario 100 shown in FIG. 1 for prompting the user how to send the displayed verification code to the server. As an example, content such as "please send the verification code via text message to the number (408) 555-1234 to complete verification" is displayed in the application scenario shown in FIG. 1.

In some embodiments, the server displays prompt messages in an application other than the application in which the current application scenario takes place. For example, in the event that the application scenario relates to online payment, rather than displaying this prompt on a payment page, the server sends a Short Message Service (SMS) (also known as "text message") prompt to a designated mobile phone number. In some embodiments, while the server provides the user with ample security education information, the server also requires the user to reply to the SMS prompt using an application other than the application running the application scenario. Content of the reply includes the verification code displayed in the application scenario. In this example, the designated mobile phone number corresponds to a mobile phone number the user has registered on the server.

When the user replies to the verification code via a text message, the telecommunications service provider forwards the text message to a server through an SMS service channel. The server checks the sender's phone number of the received text message with the phone number which the user has stored during registration and the downstream SMS text message was sent to. In some embodiments, the user previously binds their mobile phone number with their internet account, which allows the user to receive notification messages via SMS text messages. If the phone numbers match, a verification code in the received text message is compared to the verification code in the sent text message. If the verification codes match, verification of the user will be completed successfully.

In 230, the server receives a verification code sent by the user via another application that is other than the application running the application scenario.

In some embodiments, the application other than the application running the application scenario corresponds to an application capable of sending messages to the server, and the displayed verification code is included in these messages.

In some embodiments, the application used by the user to send the verification code is a text messaging application, e.g., WeChat, QQ, etc.

In some embodiments, in the text messaging application, the user sends the displayed verification code to the server via a text message to the destination phone number or contact included in the instructions prompt. Typically, equipment capable of sending text messages includes a mobile phone, but the equipment also includes other equipment already existing in the field of technology or developed in the future capable of sending text messages, such as a landline telephone. Using the mobile phone as an example, in contrast to conventional methods of receiving the verification code via the mobile phone and entering the verification code online, the verification code is displayed on a web page, and sent via the mobile phone.

In some embodiments, the user replies to an SMS prompt to send the displayed verification code.

In some embodiments, the application other than the application scenario is implemented on different terminal equipment. For example, the application scenario is an online payment application implemented on a tablet PC, and the application other than the application scenario is a text messaging application implemented on a mobile phone. In this situation, the verification code is displayed via the web page on the tablet PC, and the mobile phone sends the verification code to the server.

In some embodiments, the application other than the application scenario and the application scenario are implemented on the same terminal equipment. For example, the application scenario is an online payment application using a smart phone, and the application other than the application scenario is a text messaging application using the same smart phone. In this situation, the verification code is displayed via the web page on the smart phone, and the verification code is sent to the server by text message using the same smart phone.

In 240, the server compares the verification code from the user against the verification code generated by the server. In some embodiments, verification codes generated by the server, related information such as identification information of the user being verified, and the phone number previously registered by the user, etc., are stored in a data store (e.g., a table or the like) to allow lookup and comparison.

Since the server can send many verification codes to many different users at the same time, at least two techniques for confirming the received verification code exist. In a first technique, the server creates a unique random number in the application scenario, and the server stores the random number with the mobile phone number of the user. In some embodiments, a user ID is stored along with the mobile phone number of the user and the random number. When a verification code (the random number) is received by the server, the server retrieves the mobile phone number and the user ID, via the verification number (the random number), for verification. In a second technique, the server uses the mobile phone number to get the user ID by verifying the relationship of the user ID and the mobile phone number in the data store.

In 250, the server determines whether the user has passed identity authentication based on the results of the comparison.

In some embodiments, when the verification code from the user is identical to the generated verification code, the server determines the user to have passed identity authentication.

In some embodiments, when the verification code from the user is identical to the verification code generated by the server, the server compares a user ID of the other application used to send the message against a user ID registered on the server. When the user ID of the other application used to send the message is identical to the user ID registered on the server, the server determines the user to have passed identity authentication.

In some embodiments, the other application corresponds to a text messaging application, and the message corresponds to a text message. In this example, the user ID corresponds to a mobile phone number or a telephone number.

In one example, upon receipt of an uplink message reply from the user, the server compares content of the uplink message reply and the number of the mobile phone that sent the uplink message reply against the verification code of the server and the mobile phone number the user has registered on the server. In some embodiments, the server looks up the verification code that is included in the content of the uplink message reply to find related user information associated with this verification code, for example, the mobile phone number registered by the user. The number of the mobile phone sending the uplink message reply is compared with the registered number to determine if there is a match.

In some embodiments, the other application corresponds to WeChat or QQ, and the message corresponds to a WeChat message or a QQ message. In this example, the user ID corresponds to the WeChat number or the QQ number. WeChat and QQ are examples of messaging applications. In addition, other messaging applications such as, e.g., Whatsapp, etc. can be used.

In another example, upon receipt of an uplink message reply from the user, the server compares content of the uplink message reply and the WeChat number or the QQ number used to send the uplink message reply against the verification code of the server and the WeChat number or the QQ number that the user has registered on the server.

In some embodiments, when the user identity has been verified (i.e., identity authentication has passed), the server sends a prompt message indicating that the user identity has been verified via the application other than the application scenario (for example, by sending an SMS prompt to the user indicating that the user identity has been verified), and an uplink verification passed status is set on the server.

In some embodiments, the server displays, on an interface of the application scenario for the service, a prompt message indicating that the user identity has been verified, and an uplink verification passed status setting is set on the server.

In some embodiments, after the user sees the verification passed prompt message, a service request is submitted by the user or via a device. The server releases the service request based on a verification passed status setting.

In some embodiments, after notification of the verification code via the application scenario, the server performs identity authentication based on the above uplink message method, and during identity authentication, the server ensures consistency of dynamic verification codes and the uplink mobile phone number with their preset values. In other words, security risks are not created due to leakage or Trojan horse interception of downlink message content.

Figure 3:
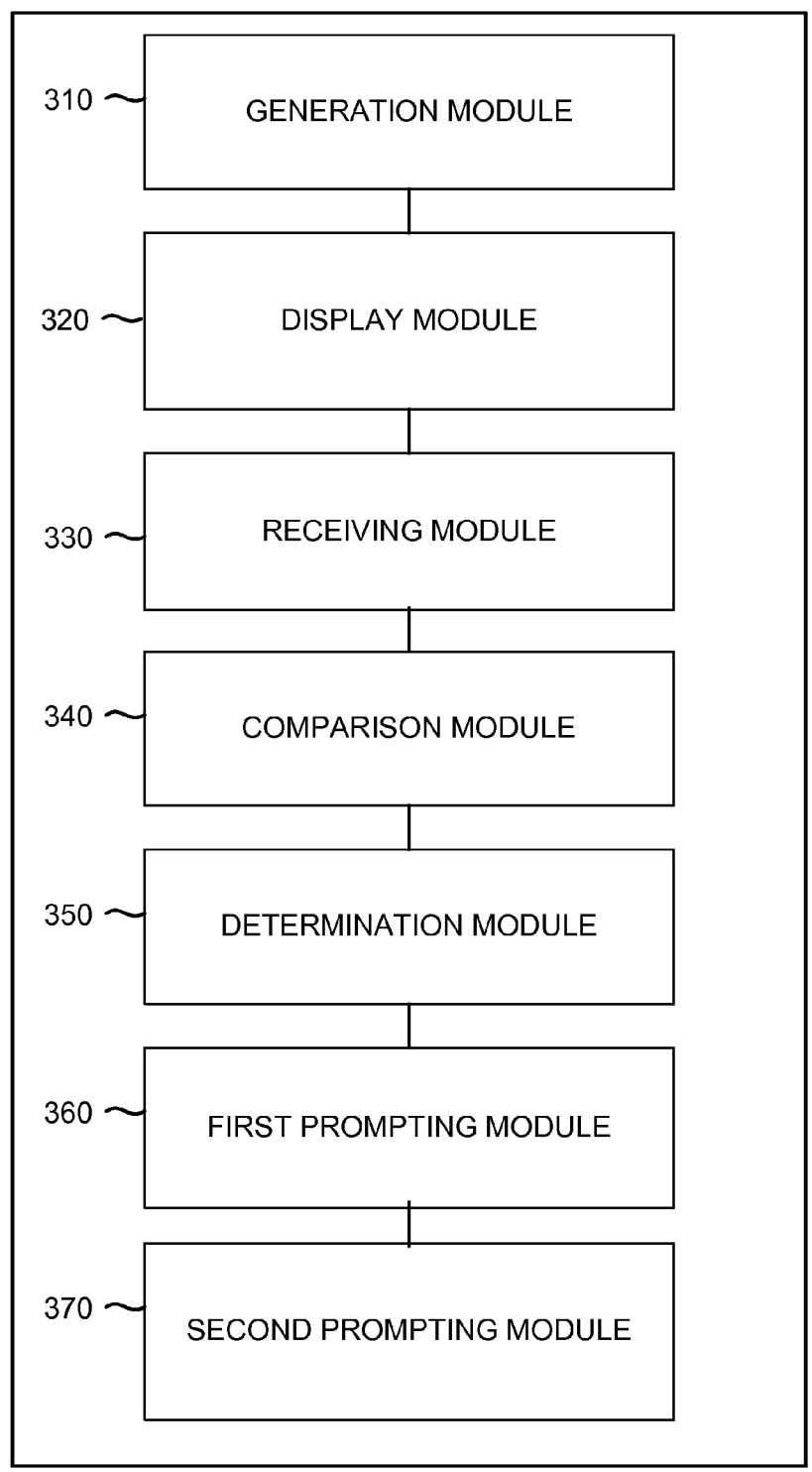
FIG. 3 is a structural block diagram of an embodiment of a device for authenticating user identity.

FIG. 3 is a structural block diagram of an embodiment of a device for authenticating user identity. In some embodiments, the device 300 implements the process 200 of FIG. 2 and comprises a generation module 310, a display module 320, a receiving module 330, a comparison module 340, and a determination module 350.

In some embodiments, the generation module 310 generates a verification code on the server.

In some embodiments, the display module 320 displays the verification code to the user in an application scenario of a service requiring user identity authentication.

In some embodiments, the receiving module 330 receives a verification code sent by the user to the server via another application that is other than the application scenario.

In some embodiments, the comparison module 340 compares the verification code from the user against the verification code generated by the server.

In some embodiments, the determination module 350 determines whether the user has passed identity authentication based on the results of the comparing.

Figure 4:
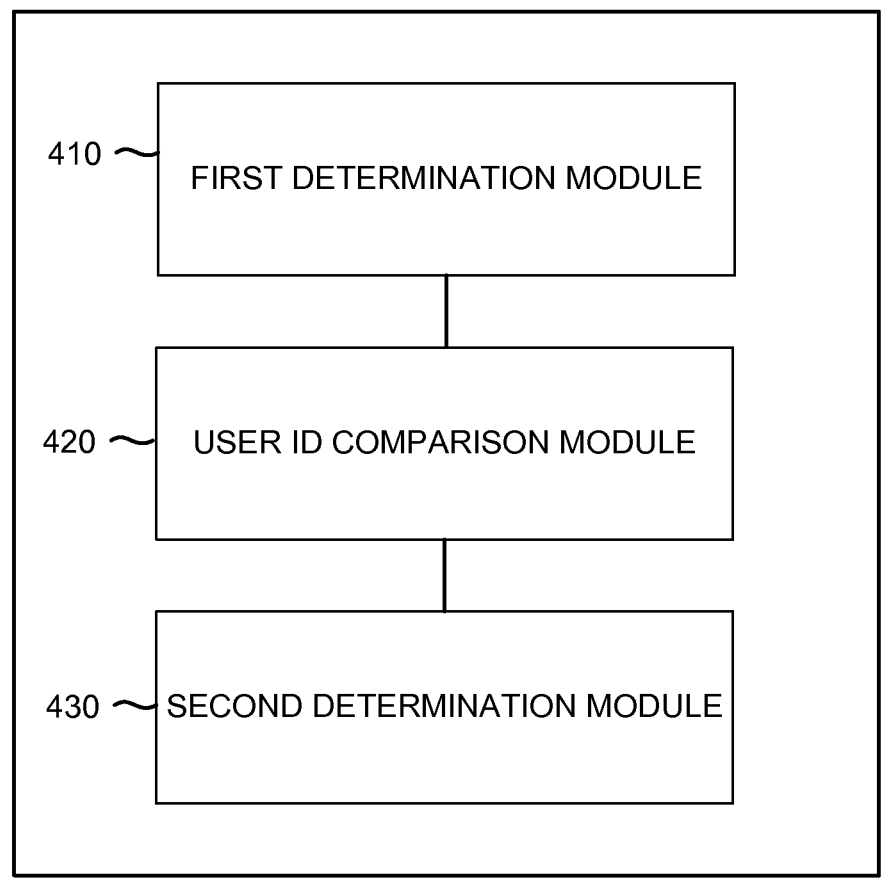
FIG. 4 is a structural block diagram of an embodiment of a determination module.

FIG. 4 is a structural block diagram of an embodiment of a determination module. In some embodiments, the determination module 400 is an implementation of the determination module 350 of FIG. 3 and comprises a first determination module 410, a user ID comparison module 420, and a second determination module 430.

In some embodiments, when the verification code from the user is identical to the verification code generated by the server, the first determination module 410 determines that the user has passed identity authentication.

In some embodiments, the application other than the application scenario corresponds to an application capable of sending messages to the server, and the displayed verification code is included in the messages.

In some embodiments, when the verification code from the user is identical to the verification code generated by the server, the user ID comparison module 420 compares the user ID of the other application used to send the message against the user ID registered on the server.

In some embodiments, when the user ID of the other application used to send the message is identical to the user ID registered on the server, the second determination module 430 determines that the user has passed identity authentication.

In some embodiments, the application other than the application scenario corresponds to a text messaging application, and the messages correspond to text messages.

In some embodiments, the user ID corresponds to a mobile phone number or telephone number.

Referring back to FIG. 3, in some embodiments, the device 300 further comprises a first prompting module 360.

In some embodiments, the first prompting module 360 displays prompt messages in the application scenario. The prompt messages prompt the user to send the verification code to the server via an application other than the application scenario.

In some embodiments, the device 300 further comprises a second prompting module 370.

In some embodiments, the second prompting module 370 displays prompt messages in the application other than the application scenario. The prompt messages prompt the user to send the displayed verification code to the server via the application other than the application scenario.

In some embodiments, the verification code corresponds to a random number.

Although the present application has been described above using the examples of Internet application scenarios, the application is not limited to Internet application scenarios, but is applicable to any application scenario involving identity authentication or password entry.

For example, the present application is applicable to community access controls. When the user is to enter a password at a community access control point, the verification code displayed on the user interface at the access control switch point can be sent to the server via a mobile phone text message (the server, for example, is administered by a property company). The server receives the verification code sent by the user via a mobile phone text message, compares the verification code against the verification code of the server, and determines whether the user has passed identity authentication based on the results of the comparing. The server thereby determines whether the user is permitted to access the community.

Figure 5:
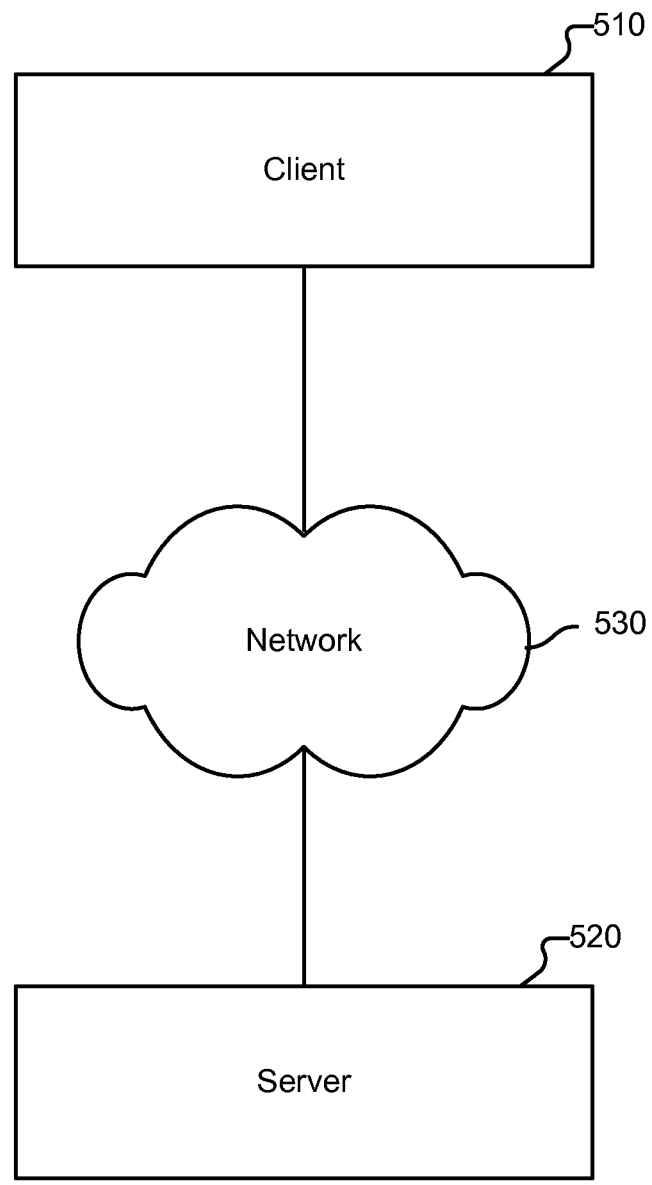
FIG. 5 is a structural diagram of an embodiment of a system for authenticating user identity.

FIG. 5 is a structural diagram of an embodiment of a system for authenticating user identity. In some embodiments, the system 500 includes a client 510 connected to a server 520 via the network 530. In some embodiments, the identity of the user using the client 510 is to be authenticated by the server 520.

Figure 6:
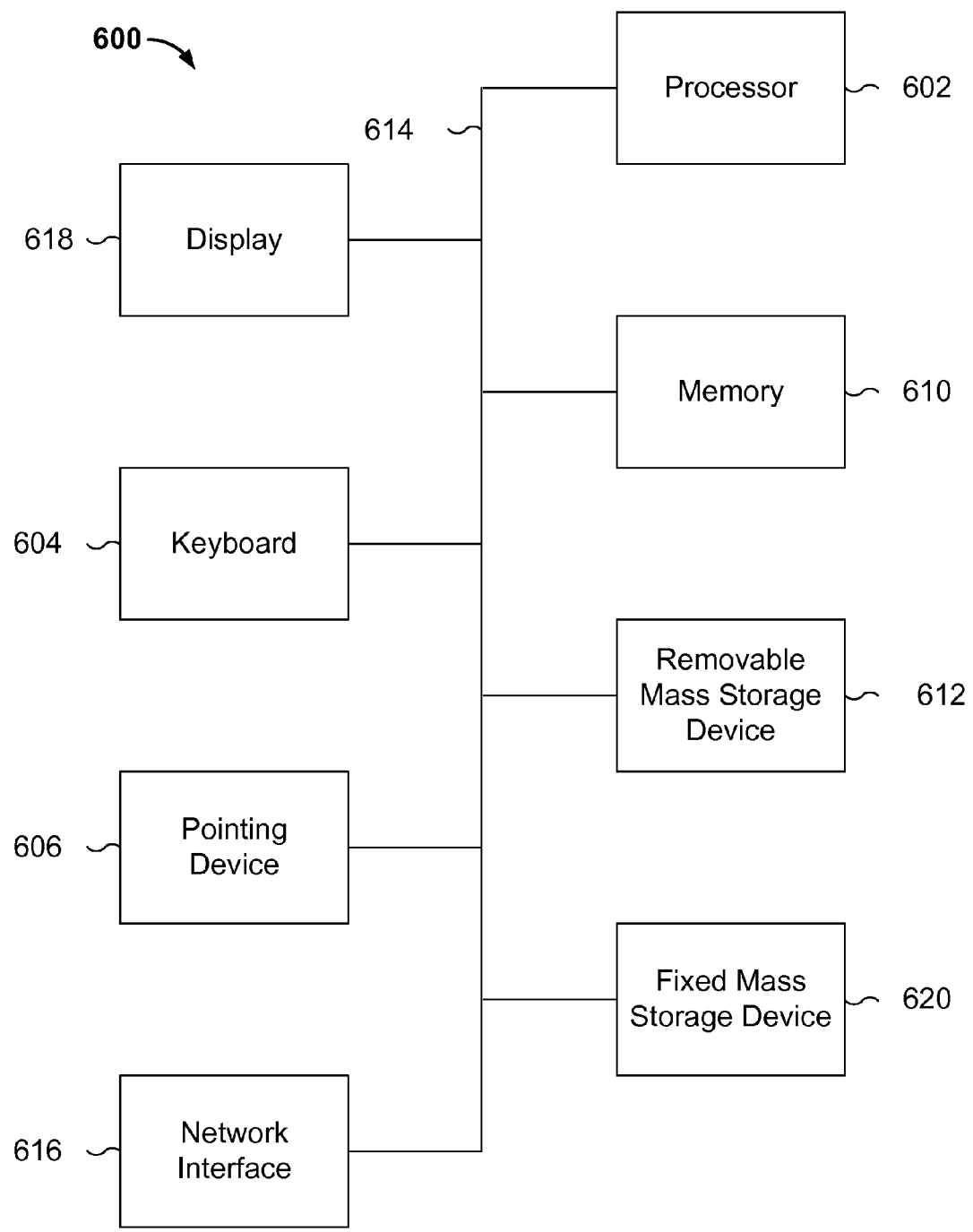
FIG. 6 is a structural diagram of an embodiment of a computer system for authenticating user identity.

FIG. 6 is a functional diagram illustrating an embodiment of a programmed computer system for authenticating user identity. As will be apparent, other computer system architectures and configurations can be used to authenticate user identity. Computer system 600, which includes various subsystems as described below, includes at least one microprocessor subsystem (also referred to as a processor or a central processing unit (CPU)) 602. For example, processor 602 can be implemented by a single-chip processor or by multiple processors. In some embodiments, processor 602 is a general purpose digital processor that controls the operation of the computer system 600. Using instructions retrieved from memory 610, the processor 602 controls the reception and manipulation of input data, and the output and display of data on output devices (e.g., display 618).

Processor 602 is coupled bi-directionally with memory 610, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 602. Also as is well known in the art, primary storage typically includes basic operating instructions, program code, data, and objects used by the processor 602 to perform its functions (e.g., programmed instructions). For example, memory 610 can include any suitable computer-readable storage media, described below, depending on whether, for example, data access needs to be bi-directional or uni-directional. For example, processor 602 can also directly and very rapidly retrieve and store frequently needed data in a cache memory (not shown).

A removable mass storage device 612 provides additional data storage capacity for the computer system 600, and is coupled either bi-directionally (read/write) or uni-directionally (read only) to processor 602. For example, storage 612 can also include computer-readable media such as magnetic tape, flash memory, PC-CARDS, portable mass storage devices, holographic storage devices, and other storage devices. A fixed mass storage 620 can also, for example, provide additional data storage capacity. The most common example of mass storage 620 is a hard disk drive. Mass storages 612, 620 generally store additional programming instructions, data, and the like that typically are not in active use by the processor 602. It will be appreciated that the information retained within mass storages 612 and 620 can be incorporated, if needed, in standard fashion as part of memory 610 (e.g., RAM) as virtual memory.

In addition to providing processor 602 access to storage subsystems, bus 614 can also be used to provide access to other subsystems and devices. As shown, these can include a display monitor 618, a network interface 616, a keyboard 604, and a pointing device 606, as well as an auxiliary input/output device interface, a sound card, speakers, and other subsystems as needed. For example, the pointing device 606 can be a mouse, stylus, track ball, or tablet, and is useful for interacting with a graphical user interface.

The network interface 616 allows processor 602 to be coupled to another computer, computer network, or telecommunications network using a network connection as shown. For example, through the network interface 616, the processor 602 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 602 can be used to connect the computer system 600 to an external network and transfer data according to standard protocols. For example, various process embodiments disclosed herein can be executed on processor 602, or can be performed across a network such as the Internet, intranet networks, or local area networks, in conjunction with a remote processor that shares a portion of the processing. Additional mass storage devices (not shown) can also be connected to processor 602 through network interface 616.

An auxiliary I/O device interface (not shown) can be used in conjunction with computer system 600. The auxiliary I/O device interface can include general and customized interfaces that allow the processor 602 to send and, more typically, receive data from other devices such as microphones, touch-sensitive displays, transducer card readers, tape readers, voice or handwriting recognizers, biometrics readers, cameras, portable mass storage devices, and other computers.

The computer system shown in FIG. 6 is but an example of a computer system suitable for use with the various embodiments disclosed herein. Other computer systems suitable for such use can include additional or fewer subsystems. In addition, bus 614 is illustrative of any interconnection scheme serving to link the subsystems. Other computer architectures having different configurations of subsystems can also be utilized.

The units described above can be implemented as software components executing on one or more general purpose processors, as hardware such as programmable logic devices and/or Application Specific Integrated Circuits designed to perform certain functions or a combination thereof. In some embodiments, the units can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The units may be implemented on a single device or distributed across multiple devices. The functions of the units may be merged into one another or further split into multiple sub-units.

The methods or algorithmic steps described in light of the embodiments disclosed herein can be implemented using hardware, processor-executed software modules, or combinations of both. Software modules can be installed in random-access memory (RAM), memory, read-only memory (ROM), electrically programmable ROM, electrically erasable programmable ROM, registers, hard drives, removable disks, CD-ROM, or any other forms of storage media known in the technical field.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for authenticating user identity, comprising:
generating a first verification code by a server;
displaying the first verification code to a user in an application scenario of a service requiring user identity authentication, wherein the displaying of the first verification code is performed by the server;
receiving a second verification code sent by the user via another application that is other than the application scenario;
comparing the second verification code sent by the user and the first verification code generated by the server; and
determining whether the user has passed identity authentication based on a result of the comparison.

2. The method as described in claim 1, wherein the determining of whether the user has passed identity authentication based on the results of the comparing comprises:
in the event that the second verification code from the user is identical to the first verification code generated by the server, determining the user to have passed identity authentication.

3. The method as described in claim 1, wherein the application scenario of the service requiring user identity authentication corresponds to a web page or a client application.

4. The method as described in claim 1, wherein:
the other application corresponds to an application capable of sending a message to the server; and
the message includes the second verification code.

5. The method as described in claim 4, wherein the determining of whether the user has passed identity authentication based on the results of the comparing comprises:
in the event that the second verification code from the user is identical to the first verification code generated by the server, comparing a user ID of the other application used to send the message against a user ID registered on the server; and
in the event that the user ID of the other application used to send the message is identical to the user ID registered on the server, determining the user to have passed identity authentication.

6. The method as described in claim 5, wherein:
the other application corresponds to a text messaging application;
the message corresponds to a text message; and
the user ID of the other application corresponds to a mobile telephone number or telephone number.

7. The method as described in claim 4, wherein:
the other application corresponds to a text messaging application; and
the message corresponds to a text message.

8. The method as described in claim 1, further comprising:
displaying a prompt in the application scenario, the prompt being used to prompt the user to send the second verification code to the server using the application other than the application scenario.

9. The method as described in claim 1, further comprising:
displaying a prompt in the application other than the application scenario, the prompt being used to prompt the user to send the second verification code to the server using the application other than the application scenario.

10. The method as described in claim 1, wherein the first verification code is randomly generated.

11. The method as described in claim 1, wherein the first verification code corresponds to a unique random number.

12. A system for authenticating user identity, comprising:
at least one processor configured to:
generate a first verification code by a server;
display the first verification code to a user in an application scenario of a service requiring user identity authentication, wherein the displaying of the first verification code is performed by the server;

receive a second verification code sent by the user via another application that is other than the application scenario;
compare the second verification code sent by the user and the first verification code generated by the server; and
determine whether the user has passed identity authentication based on a result of the comparison; and
a memory coupled to the at least one processor and configured to provide the at least one processor with instructions.

13. The system as described in claim 12, the determining of whether the user has passed identity authentication based on the results of the comparing comprises:
in the event that the second verification code from the user is identical to the first verification code generated by the server, determine the user to have passed identity authentication.

14. The system as characterized in claim 12, wherein the application scenario of the service requiring authentication of user identity is a web page or client application.

15. The system as described in claim 12, wherein:
the other application corresponds to an application capable of sending a message to the server; and
the message includes the second verification code.

16. The system as described in claim 15, wherein the determining of whether the user has passed identity authentication based on the results of the comparing comprises:
in the event that the second verification code from the user is identical to the first verification code generated by the server, compare a user ID of the other application used to send the message against a user ID registered on the server; and,
in the event that the user ID of the other application used to send the message is identical to the user ID registered on the server, determine the user to have passed identity authentication.

17. The system as described in claim 16, wherein:
the other application corresponds to a text messaging application; and
the user ID of the other application corresponds to a mobile phone number or telephone number.

18. The system as described in claim 15, wherein:
the other application corresponds to a text messaging application; and
the message corresponds to a text message.

19. A computer program product for authenticating user identity, the computer program product being embodied in a tangible non-transitory computer readable storage medium and comprising computer instructions for:
generating a first verification code by a server;
displaying the first verification code to a user in an application scenario of a service requiring user identity authentication, wherein the displaying of the first verification code is performed by the server;
receiving a second verification code sent by the user via another application that is other than the application scenario;
comparing the second verification code sent by the user and the first verification code generated by the server; and
determining whether the user has passed identity authentication based on a result of the comparison.

* * * * *

UNITED STATES PATENT AND TRADEMARK OFFICE
CERTIFICATE OF CORRECTION

PATENT NO. : 9,560,033 B2
APPLICATION NO. : 14/954665
DATED : January 31, 2017
INVENTOR(S) : Kai Cao Page 1 of 1

It is certified that error appears in the above-identified patent and that said Letters Patent is hereby corrected as shown below:

On the Title Page

Item (30), delete "2013 1 2525777" and insert --2013 1 0252777--, therefor.

Signed and Sealed this
Third Day of October, 2017

Joseph Matal
*Performing the Functions and Duties of the*
*Under Secretary of Commerce for Intellectual Property and*
*Director of the United States Patent and Trademark Office*